United States Patent
Mockenhaupt et al.

(10) Patent No.: US 11,585,441 B2
(45) Date of Patent: Feb. 21, 2023

(54) LASER PROFILED GASKET AND METHOD FOR MANUFACTURING SAID GASKET

(71) Applicant: Dana Automotive Systems Group, LLC, Maumee, OH (US)

(72) Inventors: Martin Mockenhaupt, Buffalo Grove, IL (US); Curtis Widlock, Downers Grove, IL (US); Ruben Rodriguez, Yorkville, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 18 days.

(21) Appl. No.: 17/100,692

(22) Filed: Nov. 20, 2020

(65) Prior Publication Data

US 2022/0163115 A1 May 26, 2022

(51) Int. Cl.
*F16J 15/08* (2006.01)
*F02F 11/00* (2006.01)

(52) U.S. Cl.
CPC ......... *F16J 15/0825* (2013.01); *F02F 11/002* (2013.01)

(58) Field of Classification Search
CPC .... F02F 11/002; F02F 1/10; F02F 1/24; F02F 2200/00; F16J 15/0825
See application file for complete search history.

(56) References Cited

U.S. PATENT DOCUMENTS

| | | | | |
|---|---|---|---|---|
| 5,332,237 A * | 7/1994 | Hagiwara | ............ | F16J 15/0825 277/592 |
| 5,431,418 A * | 7/1995 | Hagiwara | ............ | F16J 15/0825 277/592 |
| 5,568,932 A * | 10/1996 | Tanaka | ................. | F16J 15/0825 277/595 |
| 6,161,520 A * | 12/2000 | Clarke | .................... | F02P 13/00 277/600 |
| 6,994,353 B2 | 2/2006 | Kinoshita | | |
| 7,287,757 B2 | 10/2007 | Chen et al. | | |
| 7,311,310 B2 | 12/2007 | Diez et al. | | |
| 8,556,271 B2 | 10/2013 | Schmitz | | |
| 8,608,178 B2 * | 12/2013 | Mori | ...................... | F02F 11/002 277/594 |
| 8,899,596 B2 * | 12/2014 | Imai | ..................... | F16J 15/0825 277/593 |
| 9,394,850 B2 | 7/2016 | Foster et al. | | |
| 9,939,066 B2 * | 4/2018 | Okano | ................. | F16J 15/0825 |
| 2001/0004146 A1 * | 6/2001 | Ogaeri | ................. | F16J 15/0825 277/591 |
| 2004/0222055 A1 * | 11/2004 | Niwa | .................. | F16D 65/0971 188/250 E |

(Continued)

FOREIGN PATENT DOCUMENTS

| | | | | |
|---|---|---|---|---|
| JP | H11201286 A | * | 7/1999 | |
| JP | 2010106710 A | | 5/2010 | |
| JP | 2012082851 A | * | 4/2012 | ........... F16J 15/0825 |

*Primary Examiner* — Kurt Philip Liethen
(74) *Attorney, Agent, or Firm* — McCoy Russell LLP (57) ABSTRACT

A gasket for a combustion chamber is provided. The gasket comprises a plated surface extending across at least a portion of the metal base. In the gasket, at least a portion of the plated surface includes a laser treated section with a first raised surface that protrudes away from the metal base and the laser treated section is arranged in a mid-span that is arranged between two cylinder openings.

19 Claims, 4 Drawing Sheets

(56) References Cited

U.S. PATENT DOCUMENTS

| | | | |
|---|---|---|---|
| 2006/0232017 A1* | 10/2006 | Hamada | F02F 11/002 |
| | | | 277/594 |
| 2008/0023922 A1* | 1/2008 | Umehara | F16J 15/0825 |
| | | | 277/592 |
| 2008/0093808 A1 | 4/2008 | Quick et al. | |
| 2008/0211197 A1* | 9/2008 | Abe | F16J 15/122 |
| | | | 277/653 |
| 2008/0280040 A1* | 11/2008 | Barrall | F16J 15/125 |
| | | | 427/256 |
| 2009/0200754 A1* | 8/2009 | Schenk | F16J 15/0825 |
| | | | 277/590 |
| 2010/0025940 A1* | 2/2010 | Uchida | F16J 15/0825 |
| | | | 277/593 |
| 2010/0109255 A1* | 5/2010 | Waldvogel | F16J 15/0825 |
| | | | 277/654 |
| 2013/0098315 A1* | 4/2013 | Beyer | F16J 15/0825 |
| | | | 123/41.31 |
| 2016/0222908 A1* | 8/2016 | Martin | F16J 15/0825 |

\* cited by examiner

LASER PROFILED GASKET AND METHOD FOR MANUFACTURING SAID GASKET

TECHNICAL FIELD

The present disclosure relates to a gasket with a laser profiled surface.

BACKGROUND AND SUMMARY

Gasket technology strives to provide robust combustion sealing. Internal combustion engines specifically establish a seal between a cylinder head and an engine block using a cylinder head gasket. Polymer coatings are deployed for sealing in these gaskets. These gaskets may further include steels layers. The chance of gasket degradation is elevated by the mechanical and thermal loading experienced by the gasket during engine operation which, under certain conditions, can lead to combustion chamber leakage.

Quick et al. in US 2008/0093808 A1 teaches a gasket with a laser treated surface where a laser beam removes material in the gasket to create round depressions in a steel layer. An elastomeric material is molded onto the depressions in an attempt to increase surface adhesion between the elastomeric bead and the steel layer of the gasket.

The inventors have recognized several drawbacks with the gasket taught in Quick and other gaskets. One drawback of the removal of the gasket's metal material via a laser is that the laser treatment process will reduce the gasket's thickness and create less compressive forces than if the material were not removed. Embrittling and warping of the metallic material in Quick's gasket may additionally result from the removal of material via a laser beam. Further, in Quick's gasket and other gaskets more generally, areas of the gasket adjacent to cylinder bridges may present sealing challenges. For instance, the gasket may experience motion near the cylinder bridge during combustion operation. Previous gaskets have been unable to tune gasket profile near the cylinder bridge and other targeted gasket areas to contend with the motion, which may lead to gasket leakage, under some conditions. Other gaskets have included shims in an attempt to enhance sealing of gasketed joints. However, the shimmed gasket may also experience leaks near the cylinder bridge, under some operating conditions. Further, localized gasket motion is exacerbated in boosted engines, due to the compression of the intake air.

To overcome at least some of the aforementioned challenges a gasket is provided. The gasket, in one example, includes a plated surface extending across at least a portion of a metal base. In the gasket, at least a portion of the plated surface includes a laser treated section with a raised surface that protrudes away from the metal base. Further in the gasket, the laser treated section is arranged in a mid-span that is arranged between adjacent cylinder openings. In this way, the gasket's profile is granularly altered by a laser treatment that increases gasket thickness in targeted areas to increase gasket stiffness and reduce motion. Gasket durability gains and decreased leakage result from this surface thickness profiling, under some conditions. In addition, this laser treatment technique reshapes existing material in the gasket (as opposed to removing gasket material) to allow the gasket to achieve high compressive forces when the gasket joint is assembled.

In another example, the laser treated section is localized in the mid-span portion. The mid-span portion is more susceptible to degradation due to its narrow width. However, the localized raised surfaces, created via laser treatment, increases that gasket's stiffness near the mid-span portion to further reduce motion during combustion operation. Consequently, gasket durability is further increased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-8B are drawn approximately to scale. However, other relative dimensions may be used, in other embodiments.

DETAILED DESCRIPTION

Embodiments of a laser profiled gasket are described herein. In the gasket, a plated material is treated with a relatively low power laser beam. The plated material resides on a metallic base to facilitate granular surface profile augmentation. In one example, the power of the laser beam during a topology augmentation step is selected to vary the surface profile of the plated material and create raised ridges to enhance sealing in targeted areas while avoiding the removal of the plated material. The lower power laser treatment may circumvent unwanted embrittling and warping of the underling metallic material, further increasing the gasket's sealing performance. The plated area with laser induced topology alterations may be located in a mid-span portion of the gasket designed to reside adjacent to a cylinder bridge of the combustion chamber. In this way, the topology augmentation may be localized in weaker gasket regions to reduce the likelihood of gasket warping, cracking, and leaking that may stem from gasket motion occurring during combustion operation.

Figure 1:
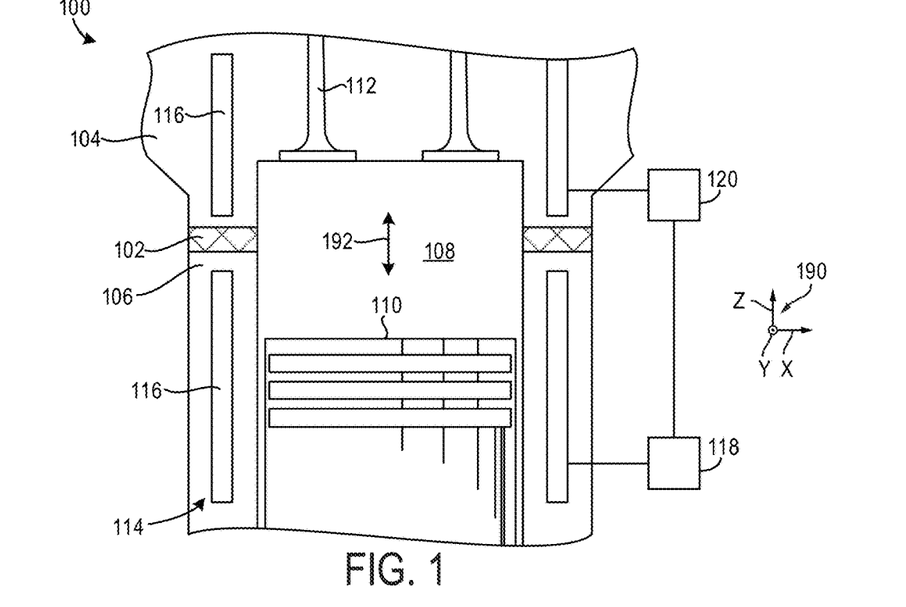
FIG. 1 shows a combustion chamber with a gasket.
Figure 2:
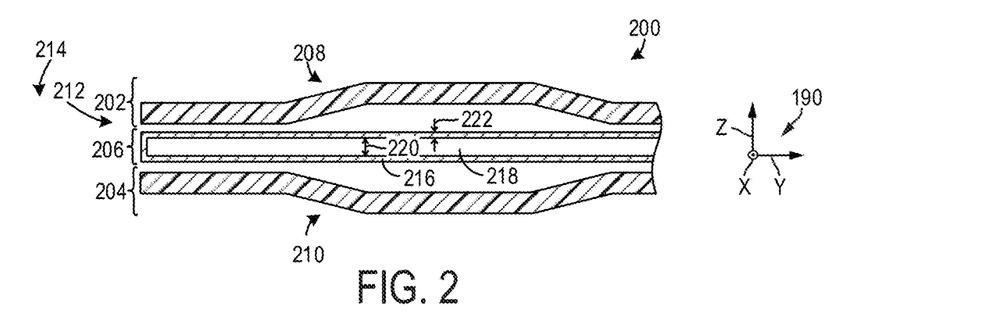
FIG. 2 shows a cross-sectional view of a first example of a gasket.
Figure 3:
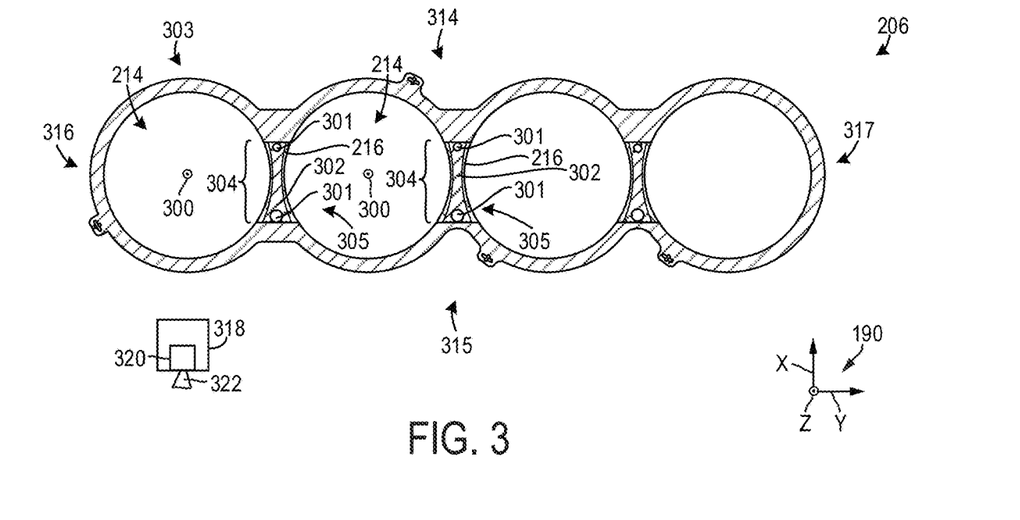
FIG. 3 shows a plan view of a shim included in the gasket, depicted in FIG. 2.
Figure 4:
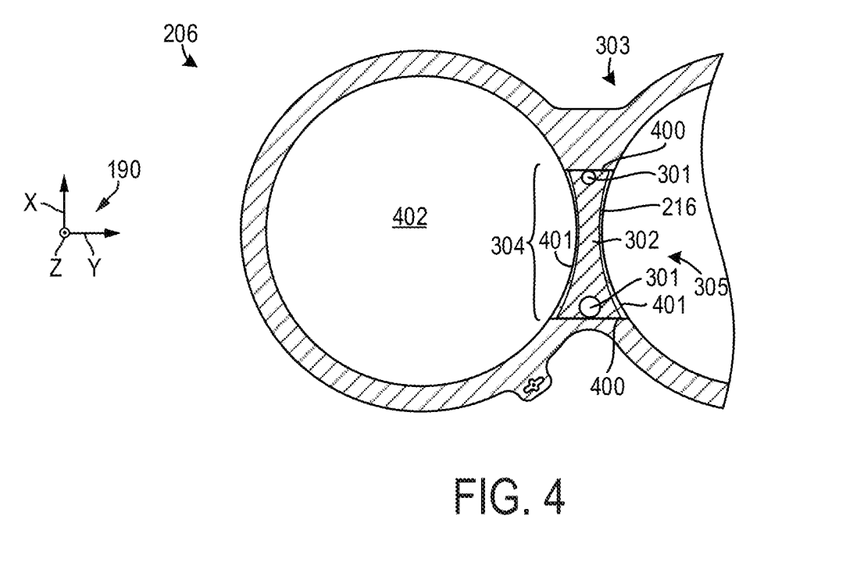
FIG. 4 shows a detailed view of section of the shim, depicted in FIG. 2.
Figure 5:
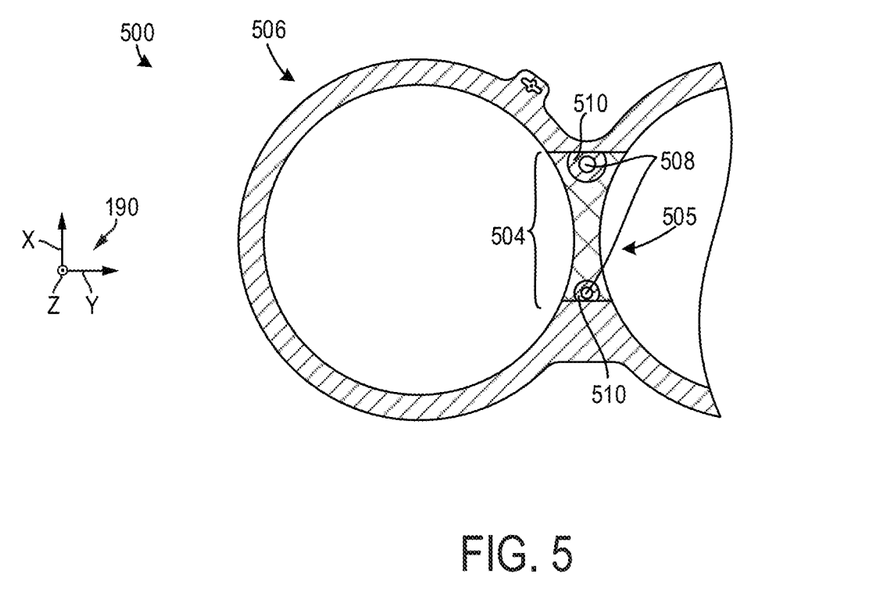
FIG. 5 shows a plan view of a second example of a shim.
Figure 6A:
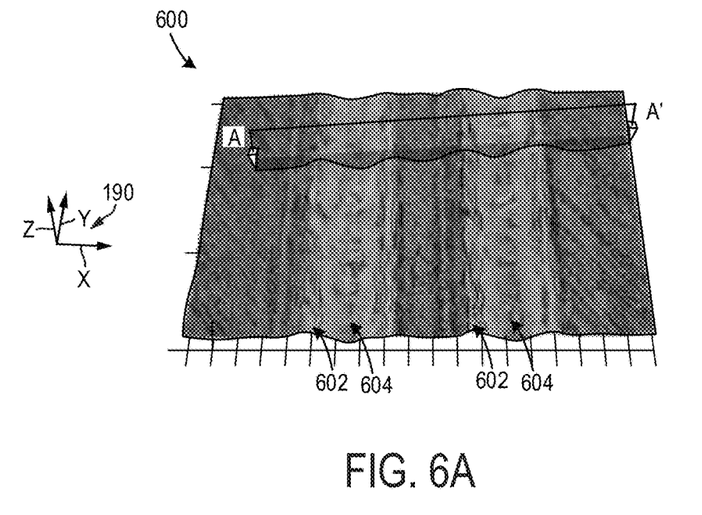
FIG. 6A shows a detailed view of a first embodiment of a microscopic shim surface.
Figure 6B:
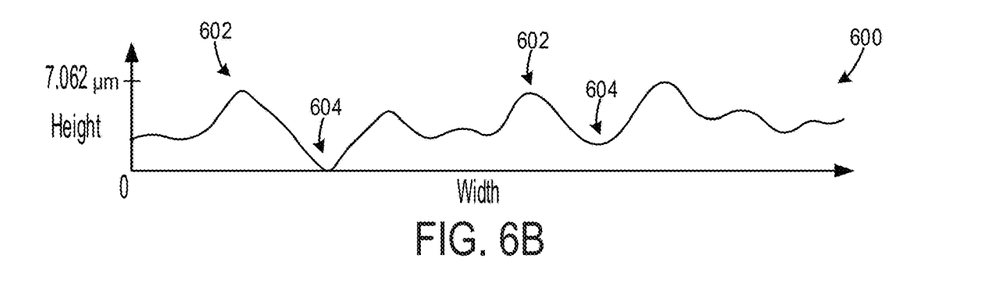
FIG. 6B shows the elevation profile of the shim surface, depicted in FIG. 6A.
Figure 7:
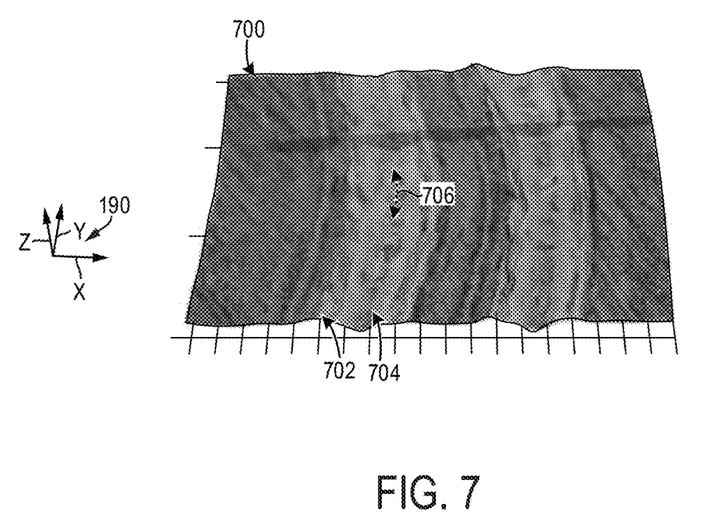
FIG. 7 shows a detailed view of a second embodiment of a microscopic shim surface.
Figure 8A:
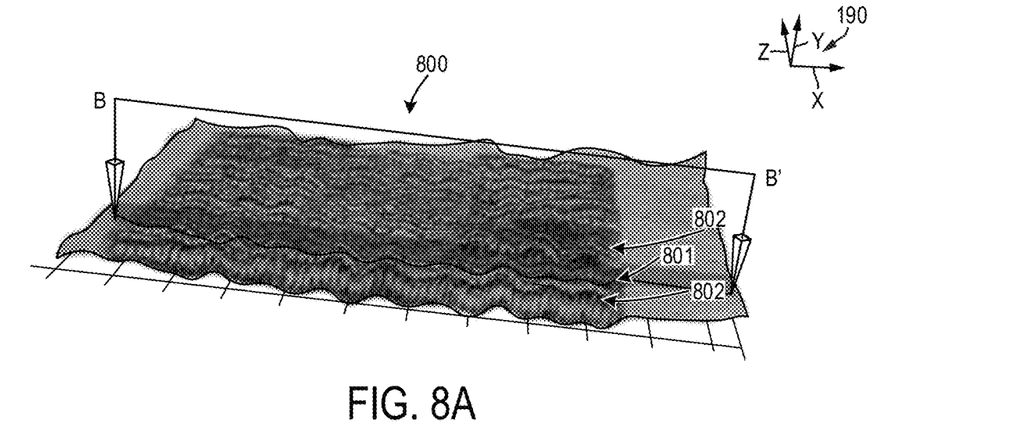
FIG. 8A shows a detailed view of a third embodiment of a microscopic shim surface.
Figure 8B:
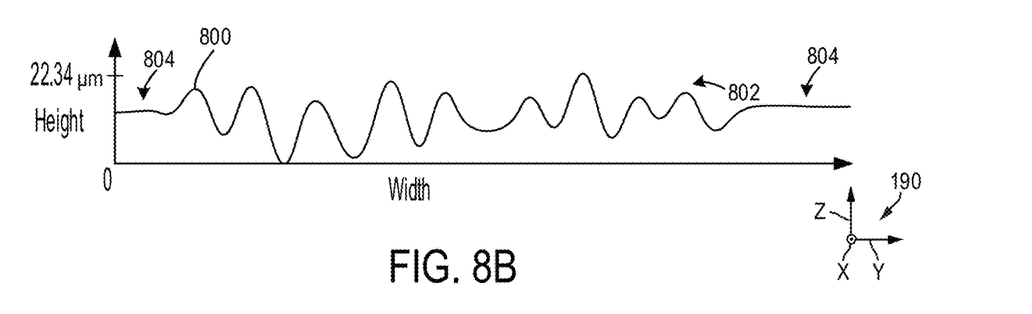
FIG. 8B shows the elevation profile of the shim surface, depicted in FIG. 8A.
Figure 9:
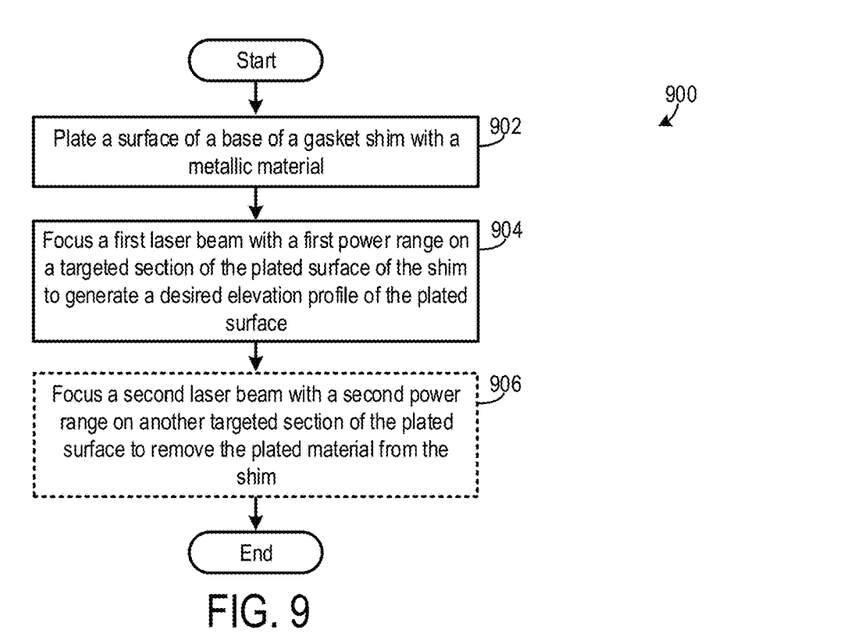
FIG. 9 shows a method for manufacturing a gasket.

FIG. 1 shows a gasket designed to robustly seal a combustion chamber. FIG. 2 illustrates a more detailed cross-sectional view of the gasket with a plated shim between upper and lower gasket section. FIGS. 3 and 4 show elevation views of a laser profiled shim in the gasket designed to increase the gasket's stiffness in selected areas to reduce motion during engine operation. FIG. 5 depicts a second embodiment of a plated shim including a laser profiled surface with a portion of the surface having raised ridges. FIG. 6A-6B illustrate a topology of a first embodiment of a shim with a multiple raised surfaces in the microscopic scale. FIG. 7 illustrates a topology of a second embodiment of a shim with multiple arcuate raised surfaces in the microscopic scale. FIG. 8A-8B depict a topology of a third embodiment of a shim with a grid pattern in the microscopic scale. FIG. 9 illustrates a gasket manufacturing method for plating a metallic base and creating raised sections on a plating of the gasket via a laser beam to enhance the gaskets sealing capabilities.

FIG. 1 shows an illustration of an internal combustion engine 100 with a gasket 102 positioned between two components. Specifically, in the illustrated embodiment, the gasket 102 is interposed between a cylinder head 104 and a cylinder block 106 of the engine 100. As such in the illustrated example, the gasket may be referred to as a head gasket. As such, in one use-case example the engine may be included in a vehicle. However, in other embodiments, the gasket may be arranged between other suitable components, where sealing therebetween is desired. For instance, the gasket may be arranged in a generator or a turbine engine, in other use-case examples. More generally, the gasket may be deployed in operating environments where robust combustion chamber sealing is desired.

In the illustrated embodiment, a combustion chamber 108 is formed in the cylinder block 106 and head 104 with a piston 110 disposed therein. Intake and exhaust valves 112 are provided in the cylinder head 104 to enable combustion cycles (e.g., four-stroke combustion cycles) to take place therein. The engine 100 may include other conventional components for carrying out combustion operation such as an intake system, an exhaust system, a fuel delivery system, an emission control system, etc., as is known in the art.

The engine 100 may further include a water jacket 114 with coolant passages 116 allowing for thermal exchange and engine temperature control. The water jacket 114, in the illustrated embodiment, comprises coolant passages in the cylinder block 106 and the cylinder head 104. The water jacket 114 may be included in a cooling system that comprises a pump 118, a heat exchanger 120, and other conventional components such as valves, coolant conduits, etc. It will also be understood that the engine 100 may further include a lubrication system that provides a lubricant (e.g., oil) to the piston 110 and/or other components in the engine. As such, the gasket 102 may include openings for oil feed and drain-back passages.

The gasket 102 may seal both the combustion chamber 108 and the water jacket 114. Thus, the gasket 102 may substantially prevent unwanted escape of combustion gases, fuel, oil, etc. from the combustion chamber 108. Thus, the chance of gas leakage between adjacent cylinders may be decreased. The gasket 102 may further be designed to drive down the likelihood of unwanted escape of coolant from the water jacket 114. Therefore, the gasket 102 allows the likelihood of unwanted mixing of the combustion gases, oil, etc., and the coolant in the water jacket to be substantially reduced.

The gasket 102 is schematically depicted in FIG. 1, but it will be appreciated that the gasket has additional structural complexity such as a shim with a plated surface with a microscopic topography generated through the application of a laser beam, expanded upon herein.

An axis system 190 is also provided in FIG. 1 as well as FIGS. 2-8B for reference. In one example, the z-axis may be parallel to a vertical axis (e.g., gravitational axis), the x-axis may be a lateral axis, and the y-axis may be a longitudinal axis. However, other orientations of the axes may be used, in other examples. A central axis 192 of the combustion chamber 108 is further provided in FIG. 1, for reference.

FIG. 2 shows a cross-sectional view of an exemplary head gasket 200 formed as an assembly comprising an upper section 202, a lower section 204, and a shim 206 arranged therebetween. It will be appreciated that the head gasket 200, shown in FIG. 2, is an example of the head gasket 102, shown in FIG. 1, and therefore may be positioned between two components (e.g., the cylinder head 104 and the cylinder block 106, illustrated in FIG. 1). The descriptors "upper" and "lower" refer to relative positions of components, devices, sections, etc., along the z-axis. As such, in the frame of reference of the page, the "upper" descriptor denotes that a component, section, etc., is closer to the top of the page while the "lower" descriptor denotes that a component, section, etc., is closer to the bottom of the page. In some examples, the z-axis may be aligned with a gravitational axis, while in other examples these axes may not be aligned.

The upper section 202 may include a raised bead 208 that extends away from the shim 206 and the lower section 204 correspondingly may include a raised bead 210 that extends away from the shim in an opposing direction. When the gasket is installed in engine, the raised beads 208, 210 may interface with the cylinder head and engine block to form a fluid seal. However, gaskets with additional layers have been contemplated. Although, the raised beads 208, 210 extend away from the shim in the illustrated embodiment, alternate bead profiles may be deployed. For instance, at least one of the beads may extend toward the shim. In further embodiments, the gasket may include additional layers with beads. The specific profile of the beads and layers in the gasket may be chosen based on a variety of factors such as expected gasket loading, expected gasket operating temperature range, gasket material construction, and the like.

The gasket 200 includes an interior side 212 which may form a boundary of a cylinder opening 214. The shim 206 is shown vertically aligned with the interior sides of the upper and lower sections 202, 204. However, in other embodiments the shim 206 may be offset from the interior sides 212 of the upper and lower sections 202, 204.

The shim 206 includes plated surfaces 216 on a metal base 218. The metal base may be constructed out of steel (e.g., an austenitic stainless steel such as 301 full hardness (FH) stainless steel) and the plated surface may be constructed out of one or more of aluminum, copper, nickel, and Polytetrafluoroethylene (PTFE). Aluminum may be selected as the plating material, owing in part to its conformability, in one specific example. However, nickel or copper may be used in gaskets where plating hardness is favored, for instance. More generally, the plated surface may have a lower melting point than the melting point of the metal base. For instance, nickel that may be used in the plating material has a lower melting point than steel that may be used in the base material. This type of material construction allows the plating to be laser profiled without disturbing the base material. The metal base 218 may have a greater thickness 220 (e.g., 0.2 millimeters (mm), in one use-case example) than a thickness 222 of the plated surface (e.g., 0.005 mm, in one use-case example). This variance in plating and base material thickness may allow the laser treatment of the plating surface to be localized on the plated surface, while avoiding material changes to the base material.

Further, in one example, the plated surfaces 216 may have a substantially constant thickness. In this example, the surface may be plated via a single plating step during manufacturing. However, in other examples the thickness of the plated surface may vary. For example, the plated surface may include sections of different thicknesses. These plated sections of varying thickness may be profiled based on factors such as the localized structural integrity of the cylinder head and block and the expected localized operating temperatures in the cylinder head and block, for example. The varying thickness of the plating may be achieved via a manufacturing process in which multiple plating steps are implemented, in one scenario. For instance, the shim may be masked in one of multiple plating steps and unmasked in another plating step to achieve the variation in plating thickness.

Electroplating techniques and/or chemical plating techniques may be used to form the one or more layers of the plated surface. When the shim is plated in multiple phases a similar plating technique may be used to reduce manufacturing costs. However, scenarios where both electroplating and chemical plating are deployed have been envisioned, which may come at the expense of manufacturing complexity. The plated surface may be laser treated in desired locations, where gasket loading is expected to be higher than surrounding areas, for example. In the laser treatment the plated material may be partially melted without disturbing the base material and the energy from the laser may displace (e.g., outwardly displace) the plated material to form raised sections. The raised sections, when compressed, provide high local stress, thereby enhancing gasket sealing.

FIG. 3 shows a plan view of the shim 206 with cylinder openings 214. Central axes 300 of the openings 214, are provided for reference, along with the lateral sides 314, 315 and the longitudinal sides 316, 317 of the gasket. It will be appreciated that the central axes may align with central axis of combustion chambers, when the gasket is installed in an engine.

FIG. 3 specifically illustrates a gasket for a four-cylinder engine arrangement, though other embodiments may contain other amounts of cylinder openings (e.g., less than four, more than four, etc.). In certain embodiments, the gasket may be deployed in engines with multiple cylinder banks, and the gasket may therefore be formed as an assembly with two discrete sections.

The shim 206 may further include bolt holes, for mounting the head gasket to an engine block and cylinder head (e.g., the cylinder block 106 and cylinder head 104, depicted in FIG. 1). As such, bolts may extend through the holes, during gasket installation to axially compress the gasket. Therefore, it will be understood that the head gasket as well as the other gaskets described herein may be interposed between a cylinder head and block, when installed. The shim 206 may include eight bolt holes with two set of holes arranged on opposing sides of the cylinder openings 214. To elaborate, each of the sets of bolt holes may be aligned along an axis parallel to the y-axis. The layout, size, and quantity of bolt holes may be determined based on factors such as cylinder arrangement, gasket compressive load targets, water jacket profile, lubrication passage arrangement, etc. Furthermore, the other sections of the gasket may include other types of openings such as coolant passage openings and lubrication passage openings, for example.

The shim may further include openings 301 (e.g., coolant openings). The openings extend through the plated surfaces 216 of the mid-spans 305, in the illustrated embodiment. However, alternate arrangement of these openings have been contemplated.

The shim 206 may be laser profiled where a laser beam is applied to one or more selected areas 302 of the gasket's plated surfaces 216 to alter the topology of the plated material without removing material via the laser beam. To achieve this targeted surface profile augmentation, a relatively low powered laser beam may be deployed. For instance, the power of the laser beam may be in the range of 3-80 watts, in one example. A lower power laser may be used when the laser moves slower across the gasket surface while a higher power laser may be used in instances where the laser is moved faster across the gasket during laser treatment. Laser profiling the plated surface creates a desired topology on the plated surface while reducing the likelihood of (e.g., avoiding) unwanted changes, such as embrittling and warping, to the material characteristics of the base metallic material. Specifically, the speed of the laser across the gasket and the power of the laser may be selected to prevent the laser from cutting through or melting through the metal plating. The use of aluminum, copper, and/or nickel in the plated material in conjunction with the steel construction of the base material, due to the melting point variance, enables a surface profile of the plating to be augmented without unwanted changes to the underlying material. Laser treating aluminum, copper, nickel, or other low resistance materials may be more efficient to manufacture than laser treating higher resistance metals such as steel.

FIG. 3 shows the shim 206 with laser profiled sections 302 that may traverse at least a portion of the plated surfaces 216 of the mid-spans 305 of the gasket. For instance, the laser profiled sections may extend laterally and/or longitudinally across the plated surfaces. In other embodiments, however, the laser treated section may only extend across a portion of the plated surface while the other sections of the mid-spans include a plated surface that is not laser treated. Peripheral shim sections 303 may have a non-plated surface. However, in alternate examples, the sections 303 may be at least partially plated.

As previously indicated, the power of the laser beam used in the profiling may be selected to substantially avoid the removal of the plated material to allow the gasket to achieve high compressive forces when the gasket joint is assembled and reduce the change of (e.g., avoid) warping or embrittling the base material underlying the plated surface. The mid-span is a narrower area of the gasket between two adjacent cylinder openings. Thus, the mid-span portion is bounded on longitudinal sides via the cylinder openings 214. Further, the mid-span section 304 may be specifically bounded via the outer lateral sides of the openings 301. The laser profiled sections 302 may include raised surfaces that increase the shim's stiffness locally in the mid-spans to enhance gasket sealing performance. The raised surfaces may specifically be in a microscopic scale. For instance, the raised surfaces may have a height of 20 or 10 microns or less from the base surface. In this way, sections of the gasket with a higher chance of degradation (e.g., leakage) may be stiffened to enhance sealing performance. The raised surfaces may be formed in different patterns (e.g., concentric arcs, a grid pattern, etc.) which are described in greater detail herein with regard to FIGS. 6A-8B.

In the illustrated embodiment, the laser profiled sections 302 are localized in the mid-span regions of the shim and the peripheral sections 303 are not plated. Positioning the laser topographically augmented surfaces in this arrangement allows the weaker sections of the gasket to be strategically strengthened to fine tune the gasket's sealing performance. The laser profiled sections 302 may be expanded and/or additional discrete sections of the shim may be laser profiled, in other embodiments. For instance, the sections adjacent to the interior cylinder openings may have laser surface profiling or the surface profiling may extend laterally across the gasket.

FIG. 3 shows a schematically illustrated manufacturing system 318 with a laser device 320 designed to generate a laser beam 322. It will be understood that the manufacturing system 318 may be used to create the shim 206 and/or other sections of the gasket in which the shim is incorporated.

FIG. 4 depicts a detailed view of the shim 206 with the laser profiled sections 302 and the peripheral sections 303 that are not laser profiled. As depicted, the lateral edges 400 of the plated mid-span sections 216 are planar and aligned with the lateral edges of the laser treated sections 302. Additionally, as illustrated, longitudinal edges 401 of the plated mid-span sections 216 are bounded by the cylinder opening. However, in other examples, the lateral edges of the laser treated sections may extend laterally outward from the openings 301.

The peripheral sections 303 that include a metallic base that has not been plated, are again depicted in FIG. 4. The peripheral sections 303 are shown wrapping around a longitudinal side 316 of the shim 206 that is adjacent to an outer cylinder opening 402. It will be appreciated that the longitudinal side of the shim may be stronger than the mid-span shim sections and therefore the plating and laser profiling of the surface may be omitted from the longitudinal side of the shim. However, in other examples, a least a portion of the shim wrapping around the outer cylinder opening may be laser profiled. Further in other examples, the majority of the shim's plated surface may be profiled via laser treatment to give the shim a higher unit stress which may further enhance gasket sealing performance. In such an example, the laser treatment may again involve solely plated surface profile augmentation without the removal of the plated material by the laser.

FIG. 5 depicts another embodiment of a shim 500. The shim 500 may share several structural and functional features with the shim 206 described above with regard to FIGS. 1-4. For instance, the shim 500 includes a plated surface 504 on a base material with a laser profiled section 510 and a non-plated section 506. As such, redundant description is omitted for brevity.

The laser treated sections 510 with raised surfaces are shown in the mid-spans 505 locally located around openings 508. However, additional or alternate profiles of the laser treated sections have been envisioned, such as laser treating all of the plated surface 504.

The shim 500 may further include a recessed section that has been treated via a higher power laser beam which is designed to remove plating material from the shim 500. However, in other embodiments, the shim may forgo any recessed sections formed via a high power laser treatment. The recessed sections may be located in areas surrounding bolt openings. Thus, in one example, the higher power laser beam may have a power that is equal to or greater than 5 or 10 watts, in some cases. The upper threshold power for the higher power laser beam may be 100 watts, in one specific example. However, other high power beam values have been contemplated and may be selected based on the type of plating material and base material used in the shim and/or the speed of the laser treatment. The recessed section treated by the higher power laser would have less stiffness and therefore form a softer area in the gasket. This softer area may therefore be provided in areas of surplus gasket load, such as areas under the bolt heads, adjacent to the bolt shank, etc. The recessed section therefore enables loads to be redistributed to other areas and create more even load distribution across the gasket which may further enhance sealing performance.

FIG. 6A depicts a detailed view of a first embodiment of a microscopic topology of a laser treated shim surface 600. It will be appreciated that any of the shims shown in FIGS. 1-5 may include the microscopic topology shown in FIG. 6A or the other embodiments of the shim's microscopic topology, illustrated in FIGS. 7 and 8A. The laser profiled surfaces include raised peaks 602 and trenches 604 that laterally extend along the surface. The peaks and trenches are approximately aligned along straight axes. However, the peaks and trenches may have an arcuate shape, described in greater detail herein with regard to FIG. 7. Cutting plane A-A' indicates the cross-section for the elevation view illustrated in FIG. 6B.

FIG. 6B shows an elevation view of the laser treated surface 600 with the peaks 602 and trenches 604. The height of the laser treated surface is indicated on the y-axis and the width of the laser surface is on the x-axis. 7.064 μM is the upper height of the laser treated surface, in the illustrated example. However, in other examples, the surface may have a height variance of 20 or 10 μm or less. The height variance may be measured from a lower height of the trenches and an upper height of the peaks. As shown, the heights of the peaks and trenches have varying heights. However, surfaces with more consistent peak and trench heights have been contemplated.

FIG. 7 illustrates a second embodiment of a microscopic topology of a laser treated shim surface 700. As shown, the laser treated surface 700 again includes raised peaks 702 and trenches 704. The raised peaks 702 and trenches 704 are however arranged in an arcuate profile (e.g., formed in concentric arcs). The approximate curvature of the arcs is indicated at 706. Shaping the peaks with a wave-like topology that has concentric arcs increases thickness and stress in locally weak areas to enhance sealing performance. The curvature of the arcs may, in one example correspond to the curvature of the cylinder openings in the gasket. Thus, in such an example, the plated surface arcs and the cylinder openings may have a common curvature. However, shim surface topologies with more or less pronounced curves may be used, in other embodiments.

FIG. 8A depicts a third embodiment of a microscopic topology of a laser treated shim surface 800. The laser treated shim surface 800 is profiled in a grid pattern. To elaborate, the surface includes a grid of trenches 801 with peaks 802 formed therebetween and arranged along lateral and longitudinal axes. The grid pattern may be conceptually divided into rows and columns of peaks. The waffle type pattern increases loading locally in the gasket to reduce unwanted motion that can lead to gasket leakage, under some conditions. Cutting plane B-B' indicates the cross-sectional view illustrated in FIG. 8B.

FIG. 8B shows an elevation view of one of the rows of peaks 802 in the laser treated surface 800. The height of the laser treated surface is indicated on y-axis and the width of the laser surface is on the x-axis. 22.34 μm is the upper height of the laser treated surface, in the illustrated example. However, other upper heights of the peaks have been contemplated. As shown, the heights of peaks vary and peripheral areas 804 may be absent of peaks and trenches. Designing the gasket with a grid profile may increase the laser treatment duration (e.g., approximately doubling the laser treatment time) when compared to the gasket with the arced surface profile. However, the grid may be approximately twice as stiff when compared to the gasket with the arced surface profile, which may be particularly desirable in engines with lower localized structural integrity, for instance.

Alternative shim embodiments may have a profile that blends the previously described arced and grid surface contours. To elaborate, one exemplary gasket may include an arced surface profile around the combustion openings and a grid type surface profile between the cylinders. In this way, the shim's topology may be selected to achieve FIG. 9 shows a manufacturing method 900 for a gasket. The method may be implemented to manufacture any of the gaskets described above with regard to FIGS. 1-8B. However, the method 900 may be implemented to manufacture other suitable gaskets, in other examples. It will be understood that a portion of the steps may be implemented via installation personnel and/or automated tooling machinery. The automated steps may therefore be stored as instructions in memory executable by a processor in a controller of a manufacturing device, for example.

At 902, the method includes plating a base of a shim with a metallic material. The metallic plating material may be aluminum, in one example. Aluminum may be used due to its conformability and compatibility with other gasket sections. In other examples, plating materials such as copper, nickel, and nickel-Polytetrafluoroethylene (PTFE), may be used. The step of plating may involve an electroplating technique or a chemical plating technique. Further in some embodiments, multiple layers of plating may be applied to the shim's base, in certain embodiments. In these embodiments, the layers of plating may be applied to selected areas via masking. For instance, selected shim sections may be covered during one of the plating steps to forgo plating of the intended section and during another plating step the section may be uncovered to allow the section to be coated with the plating. In this way, the thickness of the plating material may be varied to tune the gasket's stiffness.

At 904, the method includes focusing a first laser beam with a first power range or set-point on a targeted section of the plated surface of the shim to generate a desired elevation profile of the plated surface. The first power range may be selected to allow the surface profile of the plating to be augmented without removing the plated material. To elaborate, the first power range may be 3 watts to 10 watts. The surface profile may include raised sections in the shim's mid-spans, as previously discussed.

At 906, the method may include focusing a second laser beam with a second power range on another targeted section of the plated surface to remove the plated material from the shim. The second power range may be greater than power range of the first laser treatment and selected to remove a desired amount of material. For instance, the second power range may be 10 watts to 100 watts. However, in other examples, the second power range may be a range greater than 5 watts and the first power range may be a power range greater than 3 watts. The second power range may also be chosen to reduce the likelihood of warping or embrittling the base material underlying the plated surface. In this way, the laser material removal step may avoid unwanted changes in the gasket's material characteristics. As previously discussed, the sections around the bolt openings in the shim may be treated with a higher power laser beam to create a softer gasket area that balances load distribution in the gasket.

Method 900 allows the plated surface of the shim to be surface profiled in specific areas to strengthen weaker gasket sections while strategically weakening local gasket section such as sections near the cylinder-head bolts. Consequently, the gasket's loading distribution may be more balanced to enhance gasket performance and reduce the likelihood of gasket leakage.

The technical effect of the combustion gasket and the method for manufacturing the combustion gasket described herein is to fine tune the profile of a shim in the gasket to increase sealing performance, reduce gasket leakage, and increase gasket longevity.

FIGS. 1-8B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a gasket is provided that comprises a metal base; and a plated surface extending across at least a portion of the metal base; wherein at least a portion of the plated surface includes a laser treated section with a first raised surface that protrudes away from the metal base; and wherein the laser treated section is arranged in a mid-span that is arranged between two cylinder openings.

In another aspect, a method for manufacturing an engine gasket is provided that comprises applying a first laser beam to at least a portion of a plated surface of a metal base of a shim in the engine gasket, wherein the first laser beam has a first power value that microscopically modifies a surface profile of the plated surface without removing material from the plated surface. In one example, the method may further comprise, prior to applying the first laser beam, plating the metal base with a plating material different from the metal base to create the plated surface. In another example, the method may further comprise applying a second laser beam to a portion of the plated surface, wherein the second laser beam has a second power value which is greater than the first power value and removes one or more targeted sections of the plated surface.

In yet another aspect, an engine cylinder head gasket is provided that comprises a shim comprising: a metallic base with a plating that covers at least a portion thereof and formed of a different metallic material; wherein the plating includes a laser induced topographical variance that comprises a plurality of microscopic raised ridges and located in a mid-span between adjacent cylinder openings.

In any of the aspect or combinations of the aspects, the laser treated section may be localized in the mid-span and a height variance of the first raised surface is twenty microns or less.

In any of the aspect or combinations of the aspects, the metal base may comprise steel and the plated surface comprises aluminum.

In any of the aspect or combinations of the aspects, the plated surface may comprise at least one of copper, nickel, and Nickel-TEFLON® (Nickel-Polytetrafluoroethylene {PTFE)}).

In any of the aspect or combinations of the aspects, the laser treated section may include a second raised surface and wherein the first raised surface and the second raised surface are arranged in concentric arcs.

In any of the aspect or combinations of the aspects, the laser treated section may include a second raised surface and wherein the first raised surface and the second raised surface are arranged in a grid pattern.

In any of the aspect or combinations of the aspects, the plated surface may not include recessed sections formed via a laser material removal process.

In any of the aspect or combinations of the aspects, the plated surface may include a recessed section formed via a laser material removal process and arranged adjacent to a bolt hole.

In any of the aspect or combinations of the aspects, the metal base may be included in a shim positioned between an upper section and a lower section that each include a raised bead.

In any of the aspect or combinations of the aspects, the engine cylinder head gasket may further comprise an upper section including a first raised bead and a lower section including a second raised bead, wherein the shim is positioned between the upper section and the lower section.

In any of the aspect or combinations of the aspects, the plating may comprise aluminum.

In any of the aspect or combinations of the aspects, the plurality of raised ridges may be patterned in concentric arcs.

In any of the aspect or combinations of the aspects, the plurality of microscopic raised ridges may have a height equal to or less than ten microns.

In any of the aspect or combinations of the aspects, the plating may comprise a first section with a single layer of plating material and a second section with multiple layers of plating material.

In any of the aspects or combinations of the aspects, the first power value may be greater than or equal to three watts.

In any of the aspects or combinations of the aspects, the second power value may be greater than or equal to five watts.

In any of the aspects or combinations of the aspects, the plated surface may have a lower melting point than the metal base.

In another representation, a gasket shim with a laser profiled plated surface with a plurality of microscopic raised ridges in cylinder bridge regions positioned laterally between two bolt holes, wherein the laser profiled plated surface is constructed out of a different metal than an underlying base material on which the plating resides.

As used herein, the terms "substantially" and "approximately" are construed to mean plus or minus five percent of the value or range, unless otherwise specified.

Note that the example manufacturing routines included herein can be used to manufacture a variety of gasket configurations. At least a portion of the manufacturing steps disclosed herein may be stored as executable instructions in non-transitory memory and may be carried out by a system including a controller in combination with the various sensors, actuators, and other manufacturing equipment. Various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in a system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. It will be appreciated that the configurations disclosed herein are exemplary in nature, and that these specific examples are not to be considered in a limiting sense, because numerous variations are possible. For example, the above technology can be applied to a variety of gaskets. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A gasket, comprising:
   a metal base; and
   a metal plated layer including a metal deposited on and extending across at least a portion of a metal base, wherein the metal plated layer includes a surface;

wherein at least a portion of the surface in the metal plated layer includes a laser treated section that includes a microscopic topology with a plurality of raised peaks and a plurality of trenches and has greater stiffness than the non-plated sections of the metal base; and wherein the laser treated section is arranged in a mid-span that is arranged between two cylinder openings;

wherein the metal plated layer includes a different metal than the metal base; and wherein the metal plated layer is plated to the metal base.

2. The gasket of claim 1, wherein the laser treated section is localized in the mid-span.

3. The gasket of claim 1, wherein the metal base comprises steel and the metal plated layer comprises aluminum.

4. The gasket of claim 1, wherein the metal plated layer comprises at least one of copper and Nickel-Polytetrafluoroethylene (PTFE).

5. The gasket of claim 1, wherein the plurality of raised peaks and the plurality of trenches are arranged in concentric arcs.

6. The gasket of claim 1, wherein the plurality of raised peaks and the plurality of trenches are arranged in a grid pattern.

7. The gasket of claim 1, wherein the metal plated layer does not include recessed sections formed via a laser material removal process.

8. The gasket of claim 1, wherein the metal plated layer has a lower melting point than the metal base.

9. The gasket of claim 1, wherein the metal base is included in a shim positioned between an upper section and a lower section that each include a raised bead.

10. A method for manufacturing an engine gasket, comprising:

electroplating and/or chemical plating a metal base with a plating material different from the metal base to create a metal plated layer that is arranged in a mid-span that is positioned between two cylinder openings; and applying a first laser beam to a section of the metal plated layer on a metal base of the engine gasket to form a laser treated section, wherein the first laser beam has a first power value that microscopically modifies a surface profile of a surface of the metal plated layer with a microscopic topology with a plurality of raised peaks and a plurality of trenches without removing material from the metal plated layer;

wherein the laser treated section has greater stiffness than the non-plated sections of the metal base; and wherein the metal plated layer includes a different metal than the metal base.

11. The method of claim 10, further comprising applying a second laser beam to a portion of the surface of the metal plated layer, wherein the second laser beam has a second power value which is greater than the first power value and removes one or more targeted sections of the metal plated layer.

12. The method of claim 11, where the second power value is greater than or equal to five watts.

13. The method of claim 11, wherein the first power value is greater than or equal to three watts.

14. An engine cylinder head gasket, comprising:

a shim comprising:

a metallic base with at least one metal plated layer that covers at least a portion thereof and formed of a different metallic material;

wherein the at least one metal plated layer includes a laser induced topographical variance that comprises a plurality of microscopic raised ridges and a plurality of microscopic trenches and are located in a mid-span between adjacent cylinder openings; and wherein the laser induced topographical variance has greater stiffness than the non-plated sections of the metallic base;

wherein the metal plated layer includes a different metal than the metal base; and wherein the metal plated layer is plated to the metal base.

15. The engine cylinder head gasket of claim 14, further comprising an upper section including a first raised bead and a lower section including a second raised bead, wherein the shim is positioned between the upper section and the lower section.

16. The engine cylinder head gasket of claim 14, wherein the at least one metal plated layer comprises aluminum.

17. The engine cylinder head gasket of claim 14, wherein the plurality of microscopic raised ridges are patterned in concentric arcs.

18. The engine cylinder head gasket of claim 14, wherein the plurality of microscopic raised ridges have a height equal to or less than ten microns.

19. The engine cylinder head gasket of claim 14, wherein the at least one metal plated layer comprises a first section with a single layer of metal plating material and a second section with multiple layers of plating material.

* * * * *